United States Patent [19]
Medina Puerta et al.

[11] Patent Number: 5,638,219
[45] Date of Patent: Jun. 10, 1997

[54] ULTRACOMPACT COMPLEX OPTICAL DEVICE

[76] Inventors: Antonio Medina Puerta, 1856 Las Lunas St., Pasadena, Calif. 91107; Enrique Fariza Guttmann, Falcó, 7-12, Castellon, Spain, E-12001; José M. Estrela Ariguel, Sagunto, 1-23, Valencia, Spain, 46009; Tolis Deslis, 16834 Groverdale St., Covina, Calif. 91722-1130

[21] Appl. No.: 494,278

[22] Filed: Jun. 23, 1995

[30] Foreign Application Priority Data

Jun. 30, 1994 [ES] Spain ............................. 9401431

[51] Int. Cl.$^6$ .................................................. G02B 13/18
[52] U.S. Cl. .................................................. 359/729
[58] Field of Search .................................. 359/729, 731

[56] References Cited

U.S. PATENT DOCUMENTS 2,485,345  10/1949  Ackerman ........................ 359/731
5,473,474  12/1995  Powell .............................. 359/729

FOREIGN PATENT DOCUMENTS 680221  10/1952  United Kingdom ............... 359/731

*Primary Examiner*—Carolyn E. Fields
*Attorney, Agent, or Firm*—Richard M. Goldberg

[57] ABSTRACT

An ultracompact complex optical device made up of a monolithic block of optical material with two opposite aspherical surfaces, the primary mirror being an aspherical annular specular concave surface and the secondary mirror being an aspherical convex or concave specular surface, circular in shape; the rays of light refract as they enter the optical material and are then reflected on the primary mirror made up of the generally convergent surface of optical material, and in the secondary mirror made up of the surface of the optical material in convergent or divergent form, once or several times, and lastly these are refracted as they leave the optical material. The device is used for application in the manufacturing of magnification lenses, eyepieces, microscopes, spyglasses, whether binoculars or telescopes, large telescopes, photographic cameras and also in any instrument or device in which non-visible radiation is used or developed.

14 Claims, 2 Drawing Sheets

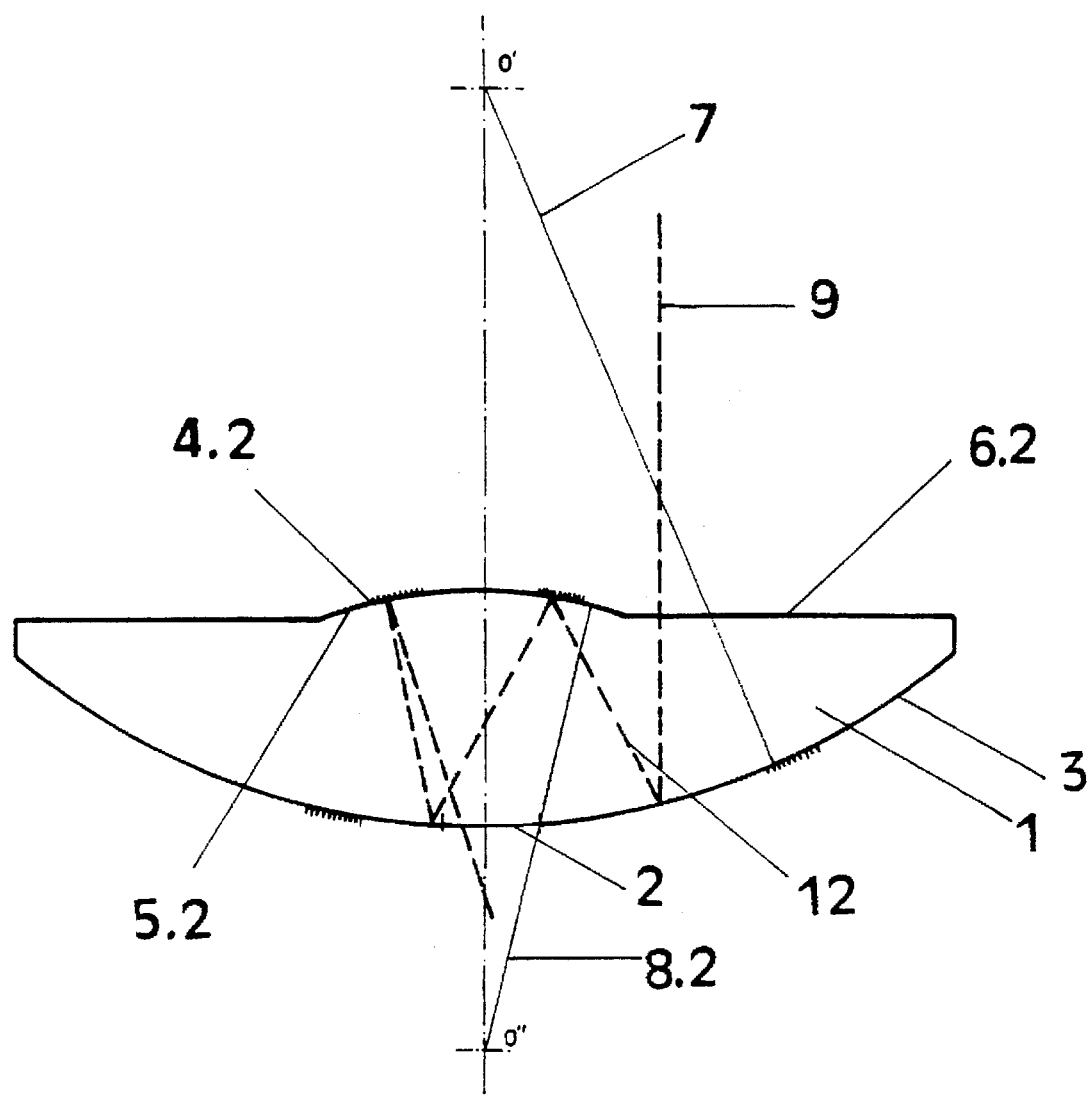

ULTRACOMPACT COMPLEX OPTICAL DEVICE

BACKGROUND OF THE INVENTION

The sector involved in this patent's technique is optical science, in particular that of the magnification of images.

In the consideration of what is explained later on it is highly important to bear in mind that this is an ultracompact complex optical device whose characteristics mean a magnification effect with accurate focusing can be obtained.

STATE OF THE ART

The lens is an extremely well-known device, which works by refraction, modifying the path of rays of light and using the curve of its surfaces and the refraction coefficient of the material it is made of to manipulate rays of light in accordance with its particular structure.

The mirror is also common knowledge. A concave mirror obtains results similar to a convex or biconvex lens.

The telescope is another well-known instrument, whose basic structure, whether this be the reflection type (catoptric) or refraction type (dioptric) requires a length equal to several times its diameter.

Reflection telescopes are generally variations of the type proposed by Newton in the 17th century. These telescopes are made up of a primary concave mirror and a secondary one located at approximately the focal point of the primary mirror, separated in the air by a certain distance. Attempts to reduce the size of this device have been numerous. In particular, Cassegrain proposed a design able to reduce the length of the telescope considerably by using a convex secondary mirror. Both mirrors are separated by air. Cassegrain's system poses great problems in the alignment and manufacture of aspherical mirrors.

U.S. Pat. No. 3,527,526 proposes a system which allows double reflection. The medium which the light ray travels across is either air or a vacuum, and each path requires reflection, and as it strikes a lens, refraction.

A telephoto lens made by the Japanese firm Nikon, called "Reflex-Nikkor 2000 f/11" for 35 mm cameras, has an optical system made up of a set of two mirrors set opposite each other, producing one sole reflection, which is based on Cassegrain's system, with the problems involved in the same. This lens has the great disadvantage of its cost: a lens of this kind has a price of over $22,000.

SUMMARY OF THE INVENTION

It may be assumed that the manufacturing cost, including moulds, of a prototype required to start a series of this ultracompact complex optical device does not come to Over $10,000. This gives a good idea of the step forward meant by the use of this kind of lens, avoiding the high costs of optical systems based on the Cassegrain system.

The aim of this invention is to provide an ultracompact complex optical device which for example enables a drastic reduction of the length of image-magnifying optical instruments in general. It is made up of specular aspheric surfaces formed for example by aluminization in a vacuum. It has aspheric surfaces defined by revolving conical surfaces.

In this proposed type of ultracompact complex optical device the thickness of the assembly is reduced whilst maintaining the focal length of the primary mirror.

The main advantage of the optical device put forward in this patent is thus the size, and within the size, the thickness of the lens, and especially the fact that said lens is a complete optical system. In relatively small sizes, it obtains highly favourable results as regards sharpness, luminosity and looking angle.

A special advantage is also that of being monolithic; this property enables use of systems with only two surfaces exposed to the outside, whilst the number of effective surfaces is unlimited. The problems of adjusting the relative position of the two surfaces are also prevented.

Another advantage lies in the price involved: the monolithic optical device is highly economical, due to being made with one sole mould, with no possible misalignments. The optical material could be optical glass or acrylic material, or other optical materials.

BRIEF DESCRIPTION OF THE DRAWINGS

In order to make the explanation following clearer, two sheets of drawings are enclosed, which represent the essence of the present invention in two figures.

FIG. 3 shows an embodiment of a monolithic lens with multiple reflections.

DETAILED DESCRIPTION OF THE PREFERRED EMBODIMENTS

Figure 1:
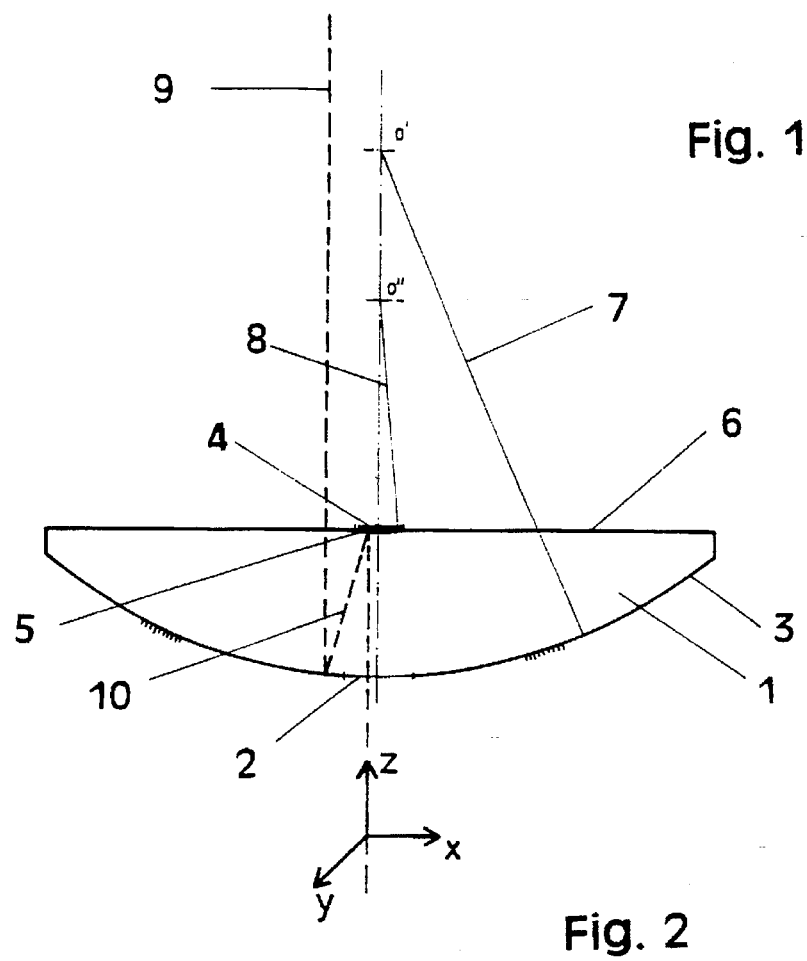
FIG. 1 shows a schematic view of an example of this ultracompact complex optical device.

In the FIGS. 1 represents the body of the lens, which is made up of a monolithic optical device, and 2 is the rear non-specular surface, 3 being the specular rear surface, 4 the front specular surface and 5 the inner reflective surface of the secondary mirror. 6 is the front outer annular surface of the lens, 7 the radius of curvature of the primary mirror, and 8 the base bending radius of the secondary mirror.

Figure 2:
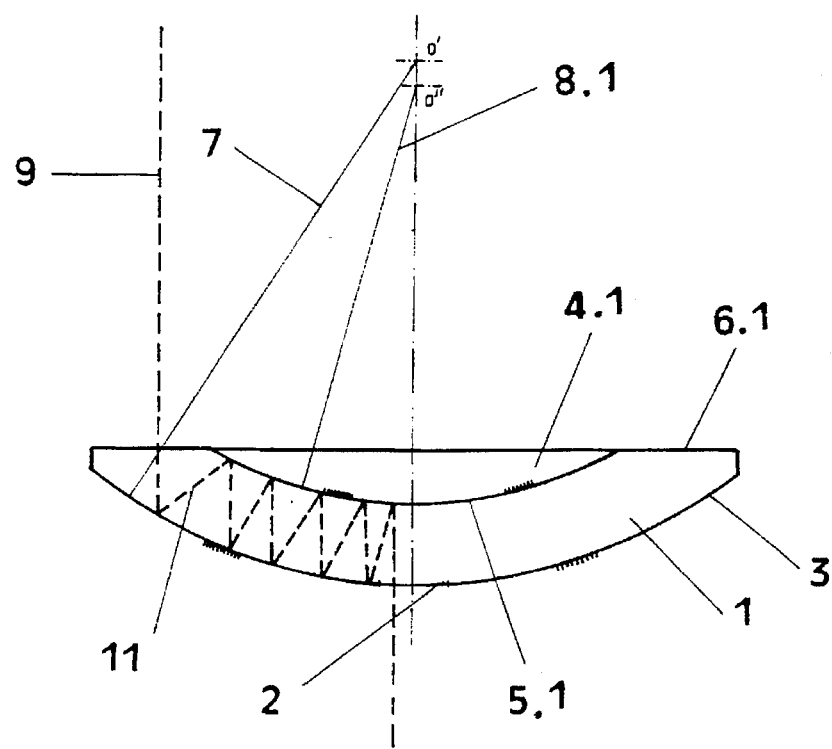
FIG. 2 shows a schematic view of a monolithic lens with multiple reflections.

FIG. 2 shows a front specular surface 4.1 with a greater base radius, an inner reflective surface 5.1 limiting a ring 6.1 with the base radius of curvature of the secondary mirror being indicated as 8.1. The ray of light is shown as number 9. The path of the ray in the lens is shown as 10 in FIG. 1 and as 11 with multiple reflection, in FIG. 2.

In FIG. 3 in which the secondary mirror 4.2 is convex with a specular surface 5.2, its bending radius 8.2 has its center at a point opposite the one of the primary mirror. The internal path of the ray is indicated as 12.

This invention uses a monolithic system, for example of acrylic material 1, which eliminates alignment and manufacturing problems and cuts down the size of the optical device.

It thus combines both systems: reflection and refraction with no change of medium.

The path of the rays according to the figures is as follows: the ray 9 is refracted in the acrylic material, and is then reflected in the primary mirror 3, then going through the acrylic material, and is reflected in the secondary mirror 5, 5.1 and lastly is refracted on coming out of the acrylic material.

The most significant differences between this system and other telescopic systems are that the secondary mirror is located very close to the primary mirror and the primary and secondary mirrors are made by the injection moulding system, thus producing a highly compact monolithic block.

FIG. 1 shows, as an illustration, a reflection per surface, whilst FIG. 2 indicates for example five reflections per surface. The ultracompact complex optical device can nevertheless use any number of reflections, and the position of the object-image conjugates is arbitrary. The ultracompact complex optical device is not limited to the configurations which are given as examples in FIGS. 1 and 2.

Given that the primary and secondary mirrors are very close together and linked, this optical system enables a much shorter total length of the telescope and gets rid of the mirror alignment problems. The principle described is applicable to other complex optical systems for magnification of images, such as for example eyepieces, microscopes, telescopes, binoculars, large telescopes, photographic cameras and others.

The size and the base radius of curvature of the secondary mirror is the determining factor, in accordance with the base radius of curvature of the primary mirror, the number of reflections provided and the size of the pupil ring. Preferably, the proportion of the base bending radii of the surfaces is from 1.5 to 10, and the proximity of the surfaces is between 0.1 and 5 times the diameter of the primary mirror.

Explanation of an example of the embodiment.

One available prototype is formed of a block of acrylic material with two aspherical surfaces opposite each other, of the commonly found conical type, with a rough central thickness of 9.8 mm. There is an aluminized aspherical concave surface forming the annular constituent of the primary mirror, of 45 mm in outer diameter, and roughly 4 mm in interior diameter and a radius of curvature of roughly 36 mm, with an aluminized aspherical convex surface which constitutes the secondary mirror, located at approximately 9.81 mm from the primary mirror. This surface is circular in shape with an approximate diameter of 4 mm and a 15 mm radius of curvature. Both mirrors are formed by aluminizing said surfaces of the acrylic material in a vacuum in the aforementioned geometrical shape. The aspherical surfaces are conical revolving surfaces.

The mathematical equation which defines both surfaces is:

$$Z = \frac{\frac{X^2 + Y^2}{R}}{1 + \left(1 - (1+K)\frac{X^2 + Y^2}{R^2}\right)^{1/2}}$$

where Z is the elevation of any point of the surface above plane X-Y.

And the R base radius constant and K conical constant are given by:

Primary mirror R=35.68902 mm, K=−1.090548. Secondary mirror; R=14.84872 mm, K=−0.8917654.

By using this system, the example enables a magnification of 2×, a field of view with no aberrations appreciable of 10 degrees, and a weight and size comparable to those of ordinary ophthalmic lenses.

In general, the number of reflections is given as a function of the:

1. Base curve of the primary mirror.
2. Base curve of the secondary mirror.
3. Size of the secondary mirror in respect of the primary one.
4. Distance between the two specular surfaces, primary and secondary mirrors.

The base curve of the primary mirror thus determines the direction of the second and successive reflections. Depending on the base curve of the secondary mirror it is possible to express in theory that there will be a greater number of reflections when both surfaces have their centers closer together.

The proximity limit between both surfaces and/or the theoretical size of the ring is that of the diffraction of light.

This can be applied to magnifying lenses, eyepieces, microscopes, spyglasses, both telescopes and binoculars, large telescopes, photographic cameras, and also in any instrument or device in which non-visible radiation is used or developed.

FIG. 1 represents a telescopic system (conjugating the object and the image in infinity) suitable for viewing with the human eye. FIG. 2 represents a telephoto lens system suitable for photographic, cinema and video cameras, telescopes, astronomical radiotelescopes and microwave antennae.

In this way an optical device such as the one described above has many applications: it can be used as a lens to facilitate the vision of people with certain eye ailments, those almost blind, for whom the quality of its luminosity, and its magnification and little thickness, enable a greater keenness which would not be appreciated with normal lenses. Furthermore, their size and lightness mean they can be mounted on glasses of a conventional type.

Another alternative application is the use in so-called binoculars: in this sense, a highly luminous lens with minimum thickness can be made with the advantage of cutting down the weight considerably.

This can also be applied in photographic lenses. The traditional telephoto lens is very long and heavy. It can unbalance the camera and make handling difficult due to the position of its center of gravity, and they are particularly costly. In this case they can be much shorter with similar results and working out cheaper.

This can also be applied to telescopes of an astronomic type. A lens with this structure could have been made for the "Hubble" telescope, though much smaller in size, thus avoiding the serious and extremely costly difficulties involved in moving the enormous lens, with the great inertia stemming from its large mass.

According to the design given in this document, one of the most immediate applications is in the manufacture of eyepieces for optical aid for people with low visual sharpness. Another application is in the manufacture of telescopes and binoculars for general use, low in weight and small in size; also in the making of microscopes, telescopes, photographic cameras, microwave antennae or other similar devices.

We claim:

1. Ultracompact complex optical device, comprising a monolithic block of optical material with two opposite aspherical surfaces; one said aspherical surface being a concave annular specular aspherical surface forming a primary mirror having a diameter and the other aspherical surface being a convex or concave specular aspherical surface forming a secondary mirror, which is circular in shape; a proportion of radii of the surfaces being from 1.5 to 10, and a proximity of the surfaces being between 0.1 and 5 times the diameter of the primary mirror.

2. Ultracompact complex optical device, according to claim 1, wherein the specular aspherical surfaces are formed by aluminization in said surfaces made of optical material in a vacuum.

3. Ultracompact complex optical device, according to claim 1, wherein the aspherical surfaces are defined by conical revolving surfaces.

4. Ultracompact complex optical device according to claim 1, wherein said device is formed from an acrylic material.

5. Ultracompact complex optical device according to claim 1, wherein said device is formed from an optical glass.

6. Ultracompact complex optical device, according to claim 1, wherein the optical material is formed by an injection moulding manufacturing process.

7. Ultracompact complex optical device comprising a monolithic block of optical material with two opposite aspherical surfaces, one said aspherical surface being a concave annular specular aspherical surface forming a primary mirror having a diameter and the other aspherical surface being a convex or concave specular aspherical surface forming a secondary mirror, which is circular in shape; a proportion of radii of the surfaces being from 1.5 to 10, and a proximity of the surfaces being between 0.1 and 5 times the diameter of the primary mirror, the two surfaces being separated by a distance of 9.81 mm, and a mathematical equation which defines both surfaces is as follows:

$$Z = \frac{\frac{X^2 + Y^2}{R}}{1 + \left(1 - (1+K)\frac{X^2 + Y^2}{R^2}\right)^{1/2}}$$

with Z being the elevation of any point on the surface over an X-Y plane, and the R being a base radius constant and K being a conical constant given by:

Primary mirror: R=35.68902 mm, K=−1.090548, and

Secondary mirror: R=14.84872 mm, K=−0.8917654.

8. Ultracompact complex optical device, comprising a monolithic block of optical material with two opposite aspherical surfaces, one said aspherical surface being a concave annular specular aspherical surface forming a primary mirror having a diameter and the other aspherical surface being a concave specular aspherical surface forming a secondary mirror, which is circular in shape; a proportion of radii of the surfaces being from 1.5 to 10, and a proximity of the surfaces being between 0.1 and 5 times the diameter of the primary mirror.

9. Ultracompact complex optical device according to claim 8, wherein the specular aspherical surfaces are formed by aluminization in said surfaces made of optical material in a vacuum.

10. Ultracompact complex optical device according to claim 8, wherein the aspherical surfaces are defined by conical revolving surfaces.

11. Ultracompact complex optical device according to claim 8, wherein said device is formed from an acrylic material.

12. Ultracompact complex optical device according to claim 8, wherein said device is formed from an optical glass.

13. Ultracompact complex optical device according to claim 8, wherein the optical material is formed by an injection moulding manufacturing process.

14. Ultracompact complex optical device according to claim 8, wherein the two surfaces are separated by a distance of 9.81 mm, and a mathematical equation which defines both surfaces is as follows:

$$Z = \frac{\frac{X^2 + Y^2}{R}}{1 + \left(1 - (1+K)\frac{X^2 + Y^2}{R^2}\right)^{1/2}}$$

with Z being the elevation of any point on the surface over an X-Y plane, and R being a base radius constant and K being a conical constant given by:

Primary mirror: R=35.68902 mm, K=−1.090548, and

Secondary mirror: R=14.84872 mm, K=−0.8917654.

* * * * *